United States Patent [19]

Abrams et al.

[11] 3,961,283
[45] June 1, 1976

[54] WAVEGUIDE GAS LASER WITH WAVELENGTH SELECTIVE GUIDE

[75] Inventors: Richard L. Abrams, Pacific Palisades; Arthur N. Chester, Malibu, both of Calif.

[73] Assignee: Hughes Aircraft Company, Culver City, Calif.

[22] Filed: Mar. 14, 1975

[21] Appl. No.: 558,612

[52] U.S. Cl. .................... 331/94.5 C; 350/96 WG
[51] Int. Cl.² ..................................... H01S 3/03
[58] Field of Search ............ 331/94.5; 350/96 WG

[56] References Cited
OTHER PUBLICATIONS

Smith, A Waveguide Gas Laser, Appl. Phys. Lett., Vol. 19, No. 5, (Sept. 1, 1971), pp. 132–134.

*Primary Examiner*—William L. Sikes
*Attorney, Agent, or Firm*—Paul M. Coble; W. H. MacAllister

[57] ABSTRACT

A waveguide gas laser is disclosed wherein narrow resonances in the loss vs. wavelength characteristics of a hollow waveguide laser resonator are employed to achieve wavelength selectivity. The laser includes a capillary bore waveguide of radius a and length 2L (or length L in a half-symmetric arrangement) which contains a laser gas having a laser transition capable of providing stimulated emission of light at wavelength $\lambda$. The aforementioned loss resonances are achieved when the waveguide dimensions and the wavelength $\lambda$ are of preselected values satisfying the relation $$\frac{a^2}{\lambda L} = \frac{1}{8N},$$

where N is a positive integer.

9 Claims, 4 Drawing Figures

WAVEGUIDE GAS LASER WITH WAVELENGTH SELECTIVE GUIDE

This invention relates to lasers, and more particularly relates to a hollow waveguide gas laser wherein the length of the waveguide is selected to provide low resonator loss for a particular laser wavelength.

Recently there has been considerable interest in waveguide gas lasers wherein the laser light propagates through a hollow waveguide, typically a capillary bore tube of dielectric material, which also serves to confine the laser-exciting discharge. Waveguide gas lasers are described by P. W. Smith, "A Waveguide Gas Laser," *Applied Physics Letters*, Vol. 19 (Sept. 1, 1971), pages 132–134, by T. J. Bridges, E. G. Burkhardt and P. W. Smith, "$CO_2$ Waveguide Lasers," *Applied Physics Letters*, Vol. 20 (May 15, 1972), pages 403–405, and by R. L. Abrams and W. B. Bridges, "Characteristics of Sealed-Off Waveguide $CO_2$ Lasers," *IEEE Journal of Quantum Electronics*, Vol. QE-9 (Sept. 1973), pages 940–946, and a detailed background analysis of light propagation modes in a hollow circular waveguide is given by E. A. J. Marcatili and R. A. Schmeltzer, "Hollow Metallic and Dielectric Waveguides for Long Distance Optical Transmission and Lasers," *Bell System Technical Journal*, Vol. 43 (July 1964), pages 1783–1809.

Although waveguide gas lasers can achieve high gain in a small, compact design, the portion of the generated laser energy which appears in sidelobes of the emitted laser beam is greater than that for other types of lasers. Moreover, for lasers capable of operating on a number of neighboring wavelength transitions, elements such as diffaction gratings, prisms, etalons, or other dispersive devices must be inserted into the laser optical cavity in order to achieve laser line selection. This not only increases the complexity of the laser, but also introduces additional loss in the laser cavity.

It is an object of the present invention to provide a waveguide gas laser in which laser line selection is achieved by the waveguide itself, thereby eliminating the need for additional wavelength selecting elements.

It is a further object of the invention to provide a wavelength selective hollow waveguide gas laser of simple and compact design, and which achieves minimum loss in the laser optical cavity.

It is a still further object of the invention to provide a waveguide gas laser capable of generating a laser beam having a smaller percentage of sidelobe energy than with waveguide gas lasers of the prior art.

A laser according to one embodiment of the invention includes a waveguiding member defining a capillary bore of radius $a$ and length $2L$. The capillary bore contains a laser gas having a laser transition capable of providing stimulated emission of light at wavelength $\lambda$. The laser gas is excited to invert the population of the energy levels of the laser transition, and an optical resonator is provided to reflect light of wavelength $\lambda$ back and forth through the capillary bore. When the bore radius $a$ and length $2L$ and the wavelength $\lambda$ are of preselected values satisfying the relation $$\frac{a^2}{\lambda L} = \frac{1}{8N},$$

where $N$ is a positive integer, the laser operates at a waveguide resonance where significantly reduced loss is achieved. As a result, the waveguide itself functions to effectively tune the laser to oscillate at the desired wavelength $\lambda$.

In another embodiment of the invention the capillary bore is of length L, and the optical resonator includes a reflector disposed sufficiently proximate to an end of the waveguiding member that no appreciable diffraction occurs between the reflector and the adjacent end of the waveguiding member. Reduced-loss waveguide resonances are achieved when the bore radius $a$ and length L and the wavelength $\lambda$ are of preselected values satisfying the aforementioned relation $$\frac{a^2}{\lambda L} = \frac{1}{8N}.$$

Additional objects, advantages and characteristic features of the invention will be apparent from the following detailed description of preferred embodiments of the invention when considered in conjunction with the accompanying drawings wherein.

Figure 1:
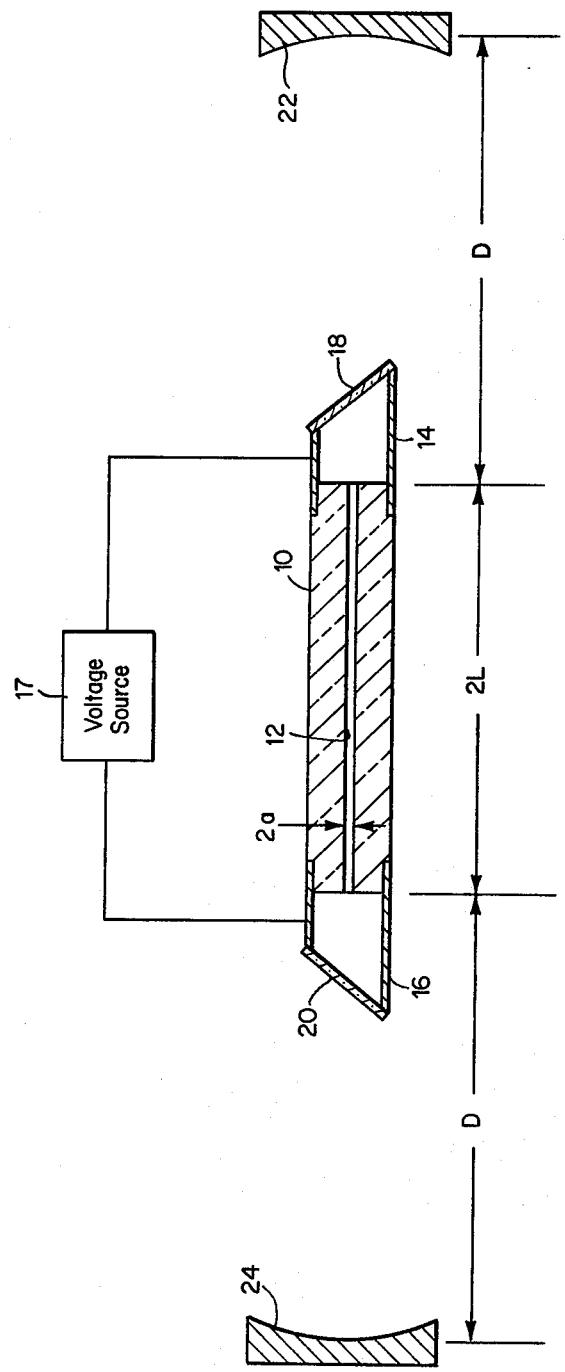
FIG. 1 is a partially schematic longitudinal sectional view illustrating a waveguide gas laser in accordance with one embodiment of the invention.

Referring to FIG. 1 with greater particularity, a waveguide gas laser is shown including a tubular waveguiding member 10 defining a capillary bore 12 therethrough of radius $a$ and length $2L$. The waveguiding member 10 may be of any material capable of guiding light at the wavelength of interest with negligible transmission loss. Typically, waveguiding member 10 is of dielectric material such as BeO, $Al_2O_3$ or fused $SiO_2$, although polished metal may also be employed, as long as sufficiently low transmission loss is achieved at the wavelength of interest.

The capillary bore 12 is filled with a laser gas having a laser transition capable of providing stimulated emission of light at a desired wavelength $\lambda$. As a specific example, the laser gas may be a mixture of $CO_2$ and He operating on the P(20) 10.591 $\mu$m transition, although it should be understood that other laser gases and transitions also may be employed. For the aforementioned specific exemplary laser gas and transition, BeO is a good material for the waveguiding member 12 on account of its negligible transmission loss in the vicinity of 10.591 $\mu$m.

Hermetically sealed to the respective ends of the tubular waveguiding member 10 and mounted in coaxial alignment with the tubular member 10 are a pair of annular electrodes 14 and 16, of Kovar for example. A voltage source 17 is connected between the electrodes 14 and 16 to supply the appropriate operating voltage which establishes a discharge through the laser gas sufficient to invert the population of the energy levels of the desired laser transition. A pair of Brewster angle windows 18 and 20, of CdTe for example, are attached by a suitable bonding agent such as epoxy to the outer ends of the respective electrodes 14 and 16. The assembly consisting of waveguiding member 10, electrodes 14 and 16, and Brewster windows 18 and 20 form a sealed enclosure for the laser gas which enables the desired gas pressure to be maintained. As a specific example, when the laser gas is a mixture of $CO_2$ and He, with the ratio of He to $CO_2$ ranging from about 3:1 to about 14:1, the total gas pressure may range from about 50 Torr to about 300 Torr.

In order to provide an optical resonator for reflecting light of wavelength $\lambda$ back and forth through the capillary bore 12, a pair of reflectors 22 and 24 are mounted beyond the respective Brewster angle windows 18 and 20 a distance D from the respective ends of the waveguiding member 10. Preferably, the reflectors 22 and 24 are concave mirrors having a radius of curvature R.

The coupling of light from the end of a waveguiding member such as 10 to the free space between the waveguiding member and a curved mirror such as 22 or 24 is discussed in detail by R. L. Abrams, "Coupling Losses in Hollow Waveguide Laser Resonators," *IEEE Journal of Quantum Electronics*, Vol. QE-8 (November 1972), pages 838–843. For a waveguide bore radius $a$, there is an effective spot size of a Gaussian beam which best matches the waveguide given by $$w_o = 0.6435a. \quad (1)$$

As discussed in the aforementioned paper by R. L. Abrams, the optimum mirror curvature R is related to the mirror position D in accordance with the relation $$R = D + B^2/D, \quad (2)$$

where B is a beam parameter defined as $$B = \pi w_o^2/\lambda. \quad (3)$$

In particular, Applicants have found that a mirror with a radius of curvature $R = 2B$ positioned a distance $D = B$ from the end of the waveguide results in a resonator with low loss and very good transverse mode selectivity (see R. L. Abrams and A. N. Chester, "Resonator Theory for Hollow Waveguide Lasers," *Applied Optics*, Vol. 13 (September 1974), pages 2117–2125). Thus, using Equations (1) and (3), appropriate values for the mirror position D and radius of curvature R may be determined from $$D = 1.3a^2/\lambda, \quad (4)$$

$$R = 2.6a^2/\lambda. \quad (5)$$

Figure 2:
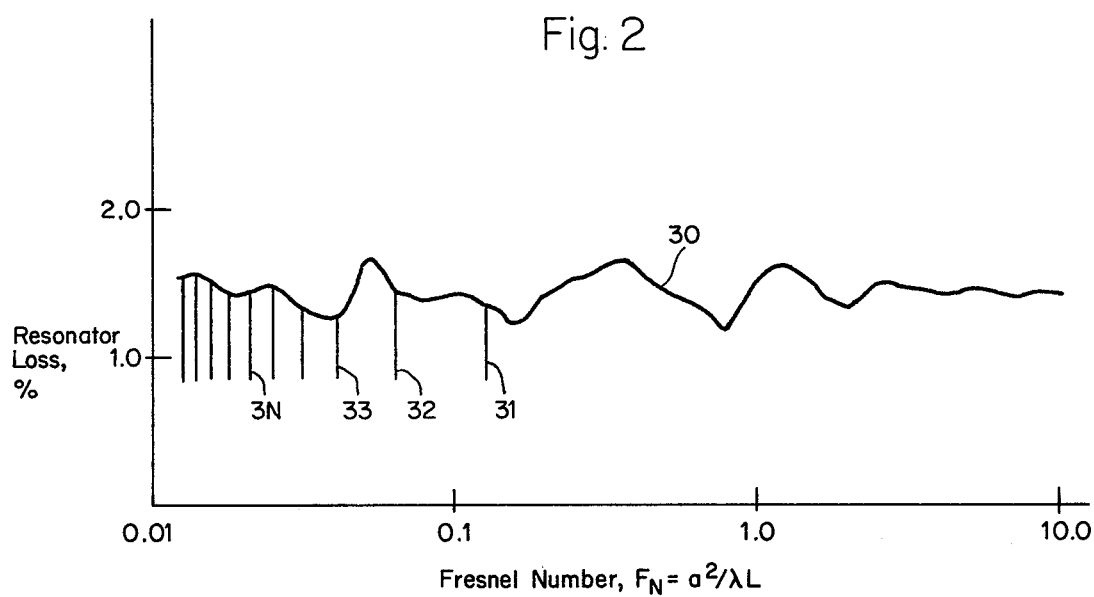
FIG. 2 is a graph showing the resonator loss as a function of Fresnel number for the laser of FIG. 1.

The electric and magnetic field distributions and mode losses (coupling loss and guiding loss) for a hollow waveguide laser can be calculated using an iterative computational technique described by A. N. Chester and R. L. Abrams, "Mode Losses in Hollow-Waveguide Lasers," *Applied Physics Letters*, Vol. 21 (Dec. 15, 1972), pages 576–578. Upon carrying out such a technique for a waveguide laser of the type described above and shown in FIG. 1, Applicants have discovered some unexpected resonances in the laser resonator loss as a function of the waveguide Fresnel number $F_N = a^2/\lambda L$, a dimensionless number characterizing the waveguide. The round trip resonator loss as a function of Fresnel number for a waveguide laser according to FIG. 1 is shown by curve 30 of FIG. 2. It may be seen from FIG. 2 that the resonator loss curve 30 has a number of resonances 31, 32, 33 ... 3N where significantly reduced loss is achieved. These loss resonances occur at respective Fresnel numbers $F_N$, where N is a positive integer, given by $$F_N = \frac{a^2}{\lambda L} = \frac{1}{8N}. \quad (6)$$

Thus, resonance 31 occurs at $F_1 = 0.125$, resonance 32 at $F_2 = 0.0625$, resonance 33 at $F_3 = 0.03125$, etc.

Since a laser tends to operate in such a way as to favor the lowest loss situation, a laser having a narrow reduced-loss resonance in its loss vs. wavelength characteristic will tend to oscillate at the resonant wavelength. Thus, when a waveguide laser according to FIG. 1 is constructed with the parameters $a$, $2L$ and $\lambda$ selected to satisfy Equation (6), operation at one of the aforementioned reduced-loss resonances will occur, thereby effectively tuning the laser so as to oscillate at the desired wavelength $\lambda$.

Figure 3:
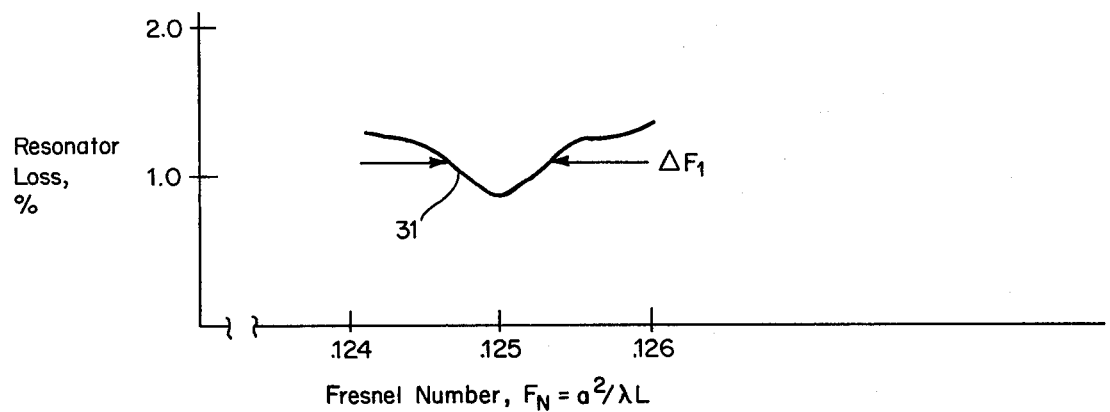
FIG. 3 is a graph similar to FIG. 2 but with an expanded Fresnel number scale to provide a more detailed illustration of a particular loss resonance.

Since the lowest order loss resonance 31 is spaced from the next loss resonance 32 by an amount greater than the spacing between any other pair of adjacent resonances, it is preferred that the laser be designed to utilize the resonance 31, which may be achieved by selecting $N = 1$ in Equation (6). The loss resonance 31 at $F_1 = 0.125$ is illustrated in more detail in FIG. 3. The width $\Delta F_1$ of resonance 31 (measured where the amplitude of the resonance is halfway between its maximum and baseline values) is $7 \times 10^{-4}$. This results in a wavelength resolution of $\Delta\lambda/\lambda = 5.6 \times 10^{-3}$ which is slightly larger than the spacing between adjacent $CO_2$ laser transitions. The wavelength resolution also determines the tolerance to which the waveguide length must be machined, assuming the square of the waveguide radius is known to a similar tolerance.

As an illustrative example of a specific waveguide gas laser which may be constructed in accordance with the invention, for a $CO_2$ laser medium operating at a wavelength of 10.591 $\mu$m, a waveguide bore radius of 0.5 mm may be employed. Thus, solving Equation (6) with $a = 0.5$ mm, $\lambda = 10.591$ $\mu$m and $N = 1$ gives a waveguide half-length $L = 18.88$ cm. Moreover, for these values of $a$ and $\lambda$, Equations (4) and (5) give a mirror separation $D = 3.07$ cm and radius of curvature $R = 6.14$ cm, respectively.

The theory underlying the aforementioned waveguide loss resonances can be explained from the waveguide transmission characteristics. If the laser is operating basically in a $TEM_{oo}$ free space laser mode, as energy is coupled from free space into the waveguide, several low order waveguide modes are excited. If these modes exit from the opposite end of the waveguide in phase (modulo $2\pi$), they will exactly reconstruct the $TEM_{oo}$ distribution in the free space outside of the opposite end of the waveguide, resulting in a low loss situation. Since 98% of the $TEM_{oo}$ energy can be coupled to the lowest loss $EH_{11}$ waveguide mode (see the above-referenced article by R. L. Abrams, "Coupling Losses in Hollow Waveguide Laser Resonators"), only a small amount of the energy is contained in the higher order waveguide modes.

In order to calculate the resonance condition, the phase shift for the $EH_{nm}$ waveguide mode, for one transit, can be written as $$\phi_{mn} = U_{nm} \frac{\lambda L}{2a^2} \quad (7)$$

where $U_{nm}$ is the mth zero of the Bessel function of order $(n-1)$ and $\lambda$, $L$ and $a$ are as defined above. The Bessel function zeroes can be approximated by $$U_{nm} \approx (m + n/2 - \tfrac{1}{4})\pi = (I/2 - \tfrac{1}{4})\pi \qquad (8)$$

where $I$ is a positive integer. The relative phase shift between any two modes is given by $$\Delta\phi = (1/4)\,\frac{\lambda L}{a^2}(P+Q)\pi \qquad (9)$$

where P and Q are positive integers. For $\Delta\phi = 2\pi J$ where $J$ is a positive integer, Equation (9) reduces to Equation (6), above, where N is a positive integer.

Figure 4:
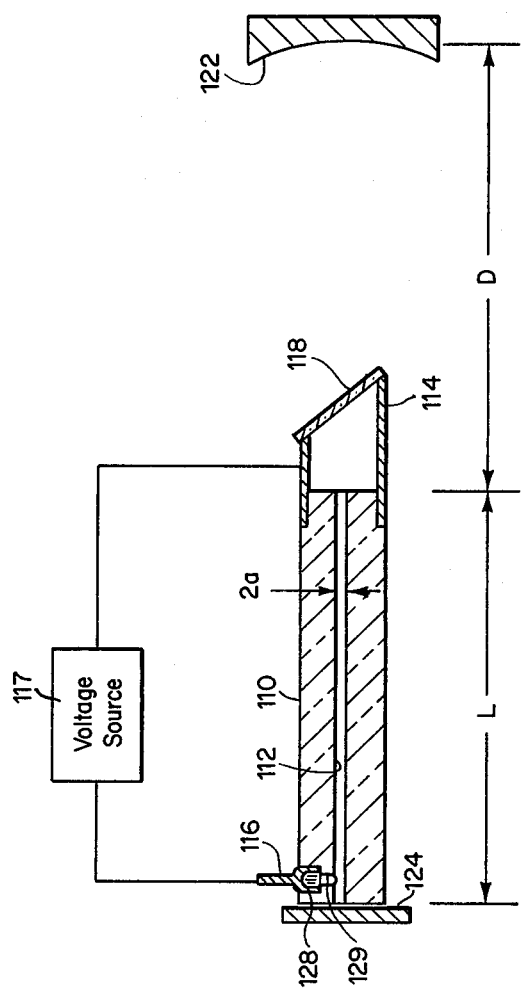
FIG. 4 is a partially schematic longitudinal sectional view illustrating a waveguide gas laser according to another embodiment of the invention.

A further embodiment of the invention, employing a half-symmetric laser geometry, is shown in FIG. 4. Components in the embodiment of FIG. 4 which correspond to respective components in the embodiment of FIG. 1 are designated by the same second and third reference numeral digits as their counterpart components in FIG. 1, along with a prefix numeral "1".

The embodiment of FIG. 4 differs from that of FIG. 1 in that capillary bore 112 through waveguiding member 110 is of length L, and reflector 124 has a flat reflective surface facing waveguiding member 110 and disposed sufficiently proximate to the adjacent end of waveguiding member 110 that no appreciable diffraction occurs between the end of the waveguiding member 110 and reflector 124. This may be achieved when the distance between reflector 124 and the adjacent end of waveguiding member 110 is substantially less than $0.13a^2/\lambda$. Moreover, electrode 116 consists of a metal rod having a cup-like portion 128 bonded to an enlarged portion of a countersunk radial bore 129 in member 110 in gas flow communication with capillary bore 112.

In the embodiment of FIG. 4 substantially all of the light traveling through capillary bore 112 and incident upon reflector 124 is reflected back through capillary bore 112. Since this light travels through a capillary bore path of length 2L before exiting into free space, the arrangement of FIG. 4 is functionally equivalent to that of FIG. 1. Thus, in the embodiment of FIG. 4, reduced-loss resonances occur at respective Fresnel numbers given by Equation (6), where L represents the length of waveguiding member 110.

From the foregoing it may be seen that by constructing a waveguide laser such that the lasing wavelength and the waveguide radius and length are selected to satisfy Equation (6), the laser will operate at a reduced-loss waveguide resonance. As a result, the waveguide itself functions to effectively tune the laser to the desired laser oscillation line, thereby eliminating the need for additional wavelength selecting elements. This enables the achievement of a wavelength selective waveguide gas laser of simple and compact design, and which is capable of generating a laser beam having a smaller percentage of sidelobe energy than with waveguide gas lasers of the prior art.

Although the present invention has been shown and described with reference to particular embodiments, nevertheless various changes and modifications which are obvious to a person skilled in the art to which the invention pertains are deemed to lie within the spirit, scope and contemplation of the invention.

What is claimed is:
1. A gas laser comprising:
a waveguiding member defining a capillary bore of radius $a$ and length 2L,
a laser gas disposed within said bore and having a laser transition capable of providing stimulated emission of light at wavelength $\lambda$,
means in association with said waveguiding member for providing an enclosure for said laser gas,
means for exciting said laser gas to invert the population of the energy levels of said laser transition,
optical resonator means for reflecting light of wavelength $\lambda$ back and forth through said capillary bore; and
said bore radius $a$ and length 2L and said wavelength $\lambda$ each being of a preselected value satisfying the relation

$$\frac{a^2}{\lambda L} = \frac{1}{8N},$$

where $N$ is a positive integer.

2. A gas laser according to claim 1 wherein said optical resonator means includes a pair of reflectors spaced from the respective ends of said waveguiding member by a distance D given approximately by $D = 1.3a^2/\lambda$.

3. A gas laser according to claim 2 wherein each of said reflectors has a concave reflective surface facing said waveguiding member and of a radius of curvature R given approximately by $R = 2.6a^2/\lambda$.

4. A gas laser according to claim 1 where $N = 1$.

5. A gas laser comprising:
a waveguiding member defining a capillary bore of radius $a$ and length $L$,
a laser gas disposed within said bore and having a laser transition capable of providing stimulated emission of light at wavelength $\lambda$,
means in association with said waveguiding member for providing an enclosure for said laser gas,
means for exciting said laser gas to invert the population of the energy levels of said laser transition,
optical resonator means for reflecting light of wavelength $\lambda$ back and forth through said capillary bore, said optical resonator means including a first reflector disposed sufficiently proximate to an end of said waveguiding member that no appreciable diffraction occurs between said end of said waveguiding member and said first reflector, and
said bore radius $a$ and length $L$ and said wavelength $\lambda$ each being of a preselected value satisfying the relation $$\frac{a^2}{\lambda L} = \frac{1}{8N},$$

where N is a positive integer.

6. A gas laser according to claim 5 wherein the distance between said first reflector and said end of said waveguiding member is substantially less than $0.13a^2/\lambda$.

7. A gas laser according to claim 6 wherein said optical resonator means further includes a second reflector spaced from the opposite end of said waveguiding member by a distance D given approximately by $D = 1.3a^2/\lambda$.

8. A gas laser according to claim 7 wherein said first reflector has a flat reflective surface facing said waveguiding member, and said second reflector has a concave reflective surface facing said waveguiding member and of a radius of curvature R given approximately by $R = 2.6a^2/\lambda$.

9. A gas laser according to claim 5 where $N = 1$.

* * * * *